Feb. 14, 1950 W. F. EBERT 2,497,075

VOICE INPUT CONTROL SYSTEM

Filed March 12, 1946 2 Sheets-Sheet 1

INVENTOR.
WILLIAM F. EBERT
BY
ATTORNEY

Feb. 14, 1950 W. F. EBERT 2,497,075

VOICE INPUT CONTROL SYSTEM

Filed March 12, 1946 2 Sheets-Sheet 2

INVENTOR.
WILLIAM F. EBERT

BY

M. O. Hayes
ATTORNEY

Patented Feb. 14, 1950

2,497,075

UNITED STATES PATENT OFFICE 2,497,075

VOICE INPUT CONTROL SYSTEM

William F. Ebert, Rutledge, Pa.

Application March 12, 1946, Serial No. 653,914

1 Claim. (Cl. 179—1)

(Granted under the act of March 3, 1883, as amended April 30, 1928; 370 O. G. 757)

This invention relates to radio transmitters, and particularly to a control system for selectively coupling a single microphone input to one or to several simultaneously operating transmitters.

One object of this invention is to provide a system to facilitate voice input control for simultaneous radio transmission over several transmitters from a common microphone.

Another object is to provide a system to facilitate carrier control for simultaneous radio transmission over several transmitters.

Another object is to provide a control system to facilitate recording of voice input to radio transmitters.

Figure 1:
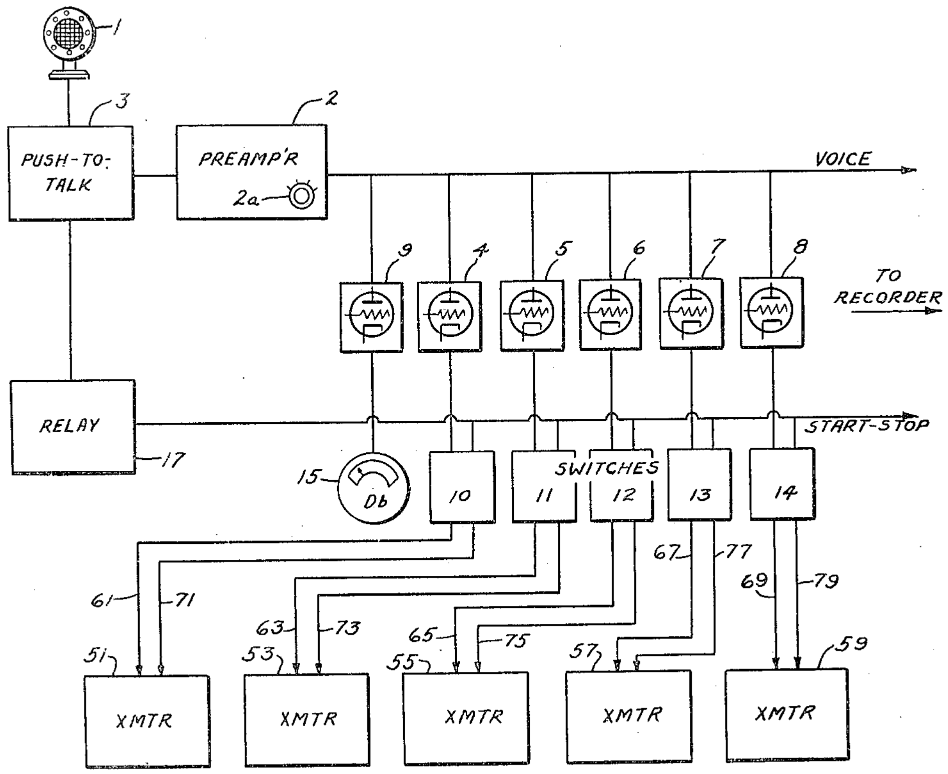
Figure 2:
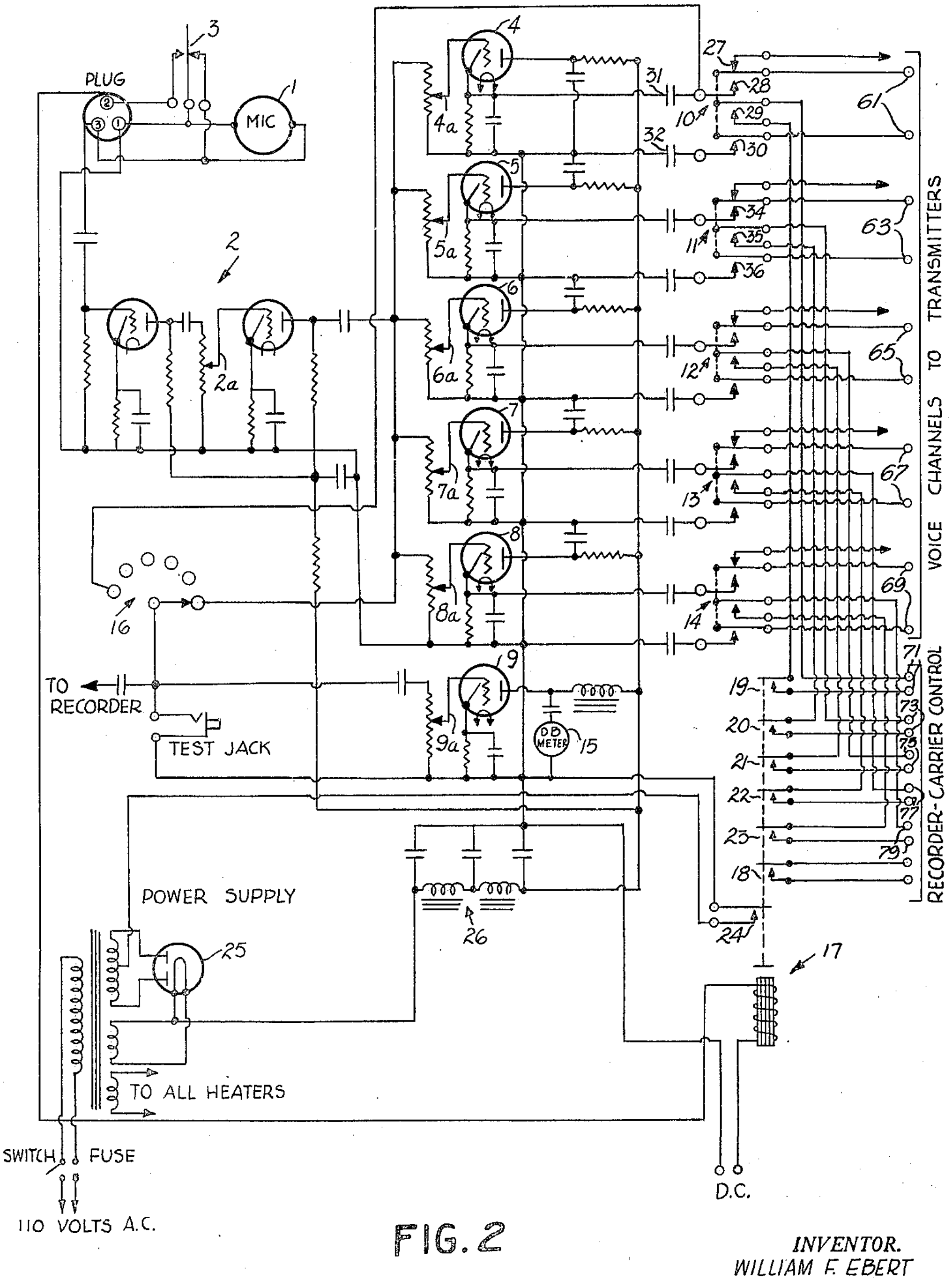

Further objects and advantages of this invention, as well as its construction, arrangement and operation, will be apparent from the following description and claim in connection with the accompanying drawings, in which, Fig. 1 is a block diagram of a radio transmitting system embodying the features of this invention, and Fig. 2 is a schematic wiring diagram of a part of the system of Fig. 1.

Figs. 1 and 2 illustrate a preferred form of this invention and disclose a microphone 1 connected to a preamplifier 2, and is thence coupled to the grids of vacuum tubes 4, 5, 6, 7, 8 and 9 connected in multiple. A push-to-talk button switch 3 normally shunts the microphone 1 to render the voice circuit inoperative except when transmission is desired. This button switch 3, when operated, breaks the shunt circuit and simultaneously completes a direct-current circuit through a multiple-contact control-relay 17.

The output of vacuum tubes 4, 5, 6, 7 and 8, operated as cathode followers, may be selectively connected through manually-operated telephone or lever-type switches 10, 11, 12, 13 and 14 respectively, to the voice channels of conventional transmitters 51, 53, 55, 57 and 59 by leads 61, 63, 65, 67 and 69, respectively.

In cathode-follower systems the external circuit load is connected across a cathode resistor. A more complete description of such a system is in "Principles of Radar" by the Staff of the M. I. T. Radar School published by the Technology Press, M. I. T., Cambridge, Mass. (1944). The use of this system in the present circuit arrangement provides an efficient transfer of energy through the tubes with minimum reaction on either the driving circuits or adjacent circuits when the load is applied or varied. In addition it has the advantage of easily matching itself to circuits over a wide range of impedance such as are found in the voice input circuits of different transmitter units. Thus, in one system such as described herein a number of separate transmitter units can be modulated at one time.

In switch 10, contact 27 (Fig. 2) leads to an external and independent voice input for use when the device of the present invention is not used. If desired, this contact and connection to the external voice input may be eliminated. Contacts 28 and 30 are connected to cathode follower 4, through direct-current blocking condensers 31 and 32. Contact 29 is in circuit of carrier contact 19. Connection of switches 11, 12, 13 and 14 is similar to above description.

A voice-level meter 15 is connected in the output of vacuum tube 9 wired as an amplifier, which tube can be selectively coupled by means of switch 16 (Fig. 2) to the preamplifier 2 output, as shown, or to the output of vacuum tubes 4, 5, 6, 7 or 8. For simplicity of illustration only the connections between switch 16 and the preamplifier output and between switch 16 and the output of one of the vacuum tubes (tube 4) are shown. The outputs of the remaining tubes 5, 6, 7 and 8 are likewise connected to appropriate contacts of the switch 16.

A manual gain control is in the grid circuit of the second tube of the preamplifier, as at 2*a*, to enable adjustments to be made to a normal voice level as indicated by the voice-level meter 15, for operators of different voice intensities. Likewise the grid circuits of each of the vacuum tubes 4, 5, 6, 7, 8 and 9 contain a manual gain control as at 4*a*, 5*a*, 6*a*, etc. enabling individual adjustment to be made in voice level from each of tubes as indicated by the voice meter 15.

As shown in Fig. 2, multiple-contact carrier-control relay 17 contains recorder control contact 18, carrier contacts 19, 20, 21, 22 and 23, and plate voltage contact 24. Control of the radio-frequency carrier channels of the transmitters 51—59 is accomplished through the connections 71—79, respectively.

Rectifying tube 25 and filter section 26 are connected in orthodox manner to supply rectified voltage to the plates of all tubes.

In operation, pushing the push-to-talk button 3 allows the voice circuit between microphone 1 and preamplifier 2 to operate, and in addition, activates multiple-contact carrier-control relay 17, which completes the plate-voltage circuit at plate-voltage contact 24, thus rendering all tubes operative. Recorder control contact 18 is closed also, starting the recorder.

If switches 10 and 11 are closed, for example, represented by the lower contacts being made, their respective carriers will be operative by circuit completion at 19 and 29, and 20 and 35. Voice input for tubes 4 and 5 will be produced by preamplifier 2 output, and the output of each cathode follower will be connected to voice channel leads through contactors 28 and 30, and 34 and 36, respectively.

Voice-level tests can be made by operation of switch 16 and observation of voice-level meter 15.

Modifications and changes can be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

Radio-frequency energy-transmitting apparatus comprising a plurality of transmitters adapted to provide a like plurality of radio-frequency carrier waves, a transducer for converting voice frequencies into an electrical output, means normally short-circuiting said transducer to render the same inoperative to affect said transmitters, a plurality of normally deenergized electron discharge tubes having respective control grids connected in parallel with each other and having individual input circuits respectively connected to said transducer, said electron discharge tubes also having individual cathode-coupled output circuits, and means operable upon removal of said short-circuiting means to couple the output circuits of said electron discharge tubes to selected ones of said transmitters, said output-circuit-coupling means comprising a relay actuatable simultaneously with deactivation of said short-circuiting means to effect energization of each of said tubes, and selectively operable switch means connecting individual cathode-coupled output circuits to individual transmitters, whereby the radio-frequency carrier waves generated only by a selected transmitter is affected by said electrical output of said transducer.

WILLIAM F. EBERT.

REFERENCES CITED

The following references are of record in the file of this patent:

UNITED STATES PATENTS

| Number | Name | Date |
|---|---|---|
| 1,272,641 | Egerton | July 16, 1918 |
| 1,900,106 | Hamilton | Mar. 7, 1933 |
| 2,146,362 | Thomsen | Feb. 7, 1939 |
| 2,246,331 | White | June 17, 1941 |